US011397811B2

(12) United States Patent
Whitmore et al.

(10) Patent No.: US 11,397,811 B2
(45) Date of Patent: *Jul. 26, 2022

(54) SYSTEM AND METHOD FOR APPLICATION TAMPER DISCOVERY

(71) Applicant: Capital One Services, LLC, McLean, VA (US)

(72) Inventors: Jon Whitmore, Washington, DC (US); Kevin Nieman, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/833,766

(22) Filed: Mar. 30, 2020

(65) Prior Publication Data

US 2021/0089655 A1 Mar. 25, 2021

Related U.S. Application Data

(63) Continuation of application No. 16/576,303, filed on Sep. 19, 2019, now Pat. No. 10,642,979.

(51) Int. Cl.
*G06F 21/00* (2013.01)
*G06F 21/56* (2013.01)
*G06F 21/52* (2013.01)

(52) U.S. Cl.
CPC ............ *G06F 21/566* (2013.01); *G06F 21/52* (2013.01); *G06F 2221/033* (2013.01)

(58) Field of Classification Search
CPC .. G06F 21/566; G06F 21/52; G06F 2221/033; G06F 21/55; G06F 21/554; H04L 63/14; H04W 12/12
See application file for complete search history.

(56) References Cited

U.S. PATENT DOCUMENTS

2005/0177633 A1* 8/2005 Plunkett ............... B41J 2/04508
709/225
2008/0271001 A1* 10/2008 Nonomura ............ G06F 21/125
717/143

(Continued)

FOREIGN PATENT DOCUMENTS

EP 3198505 A1 8/2017
EP 3267709 A1 1/2018

OTHER PUBLICATIONS

Papazoglou et al., "Service-Oriented Computing: State of the Art and Research Challenges", Computer, vol. 40, Issue: 11, Nov. (Year: 2007).*

(Continued)

*Primary Examiner* — Morshed Mehedi
(74) *Attorney, Agent, or Firm* — KDB Firm PLLC (57) ABSTRACT

A system and method for early detection of a compromised client device includes a tamper detection service configured to monitor modifications to resource access privileges over time to identify unusual variations in jailbreak status that indicate compromise of the client device. For example, the tamper detection service may monitor the jailbreak status of system files over time to expose attempts to hide the jailbreak status of a protected resource. To validate that malware is attempting to hide the jailbreak status of a protected resources, the tamper detection process may launch multiple different resource accesses, targeting the protected resource, to determine whether different accessibility results are returned, indicating a compromised device.

18 Claims, 8 Drawing Sheets

(56) References Cited

U.S. PATENT DOCUMENTS

| | | | | |
|---|---|---|---|---|
| 2012/0167061 A1* | 6/2012 | Kirovski | ............... | G06F 21/125 |
| | | | | 717/132 |
| 2014/0173733 A1* | 6/2014 | Ford | ................... | H04L 63/1416 |
| | | | | 726/23 |
| 2016/0099963 A1* | 4/2016 | Mahaffey | .............. | H04W 12/12 |
| | | | | 726/25 |
| 2017/0344406 A1* | 11/2017 | Yamaura | ................. | H04L 69/16 |
| 2020/0285752 A1* | 9/2020 | Wyatt | ................... | G06F 21/577 |

OTHER PUBLICATIONS

International Search Report and Written Opinion of International Patent Application No. PCT/US2020/051454 dated Nov. 3, 2020, 10 pages.

\* cited by examiner

SYSTEM AND METHOD FOR APPLICATION TAMPER DISCOVERY

CROSS-REFERENCE TO RELATED APPLICATIONS

This application is a continuation of U.S. patent application Ser. No. 16/576,303, entitled "SYSTEM AND METHOD FOR APPLICATION TAMPER DISCOVERY" filed on Sep. 19, 2019. The contents of the aforementioned application are incorporated herein by reference in their entirety.

BACKGROUND

Manufacturers of on-line devices typically build security protections into their products to protect against exploitation of the devices by malicious third parties. The exploitation of a computing device takes advantage of a weakness in an operating system, application, library or other software code to hack the device, for example by adding code to divert personal information for nefarious use. Exploitation can occur when a client accesses a malicious or hacked website using a client device. The malicious or hacked website may deploy an exploit pack on the client device, where the exploit pack includes software that can be used to unleash attacks against various browser vulnerabilities by deploying malware onto the victim's computer.

Client devices protect against malware by tightly controlling access to their hardware and software resources. Circumventing these protections involves "jailbreaking" the client device. Jailbreaking is a process of removing device software and hardware limitations to permit root access to the iOS operating system, allowing the download and execution of unauthorized applications, extensions, and themes that are unavailable through the official Apple App Store. For example, Cydia™ is a third party app store that provides unapproved tweaks, modified applications and games for use on protected Apple® devices.

Jailbroken devices may interact with a variety of applications provided by a service provider, placing the security of a service provider's infrastructure at risk. As such, service providers may implement security protocols that include jailbreak detection mechanisms configured to block access to jailbroken client devices. For example, one jailbreak detection mechanism may attempt to access a restricted or otherwise protected resource, such as an operating system root directory, with the ability to successfully access the protected resource reflecting the jailbroken status of the client device.

Application tweaks, available in Cydia repositories and deployed by hackers, implement countermeasures configured to intercept jailbreak detection mechanisms to obscure the jailbroken state of the client device. For example, malware may 'hook' jailbreak detection communications between an application server and the client device, by intercepting filesystem queries and returning false access status to hide the jailbroken status of restricted files. It would be desirable to identify a system and method for quickly and accurately identifying a compromised client device to protect a service provider's infrastructure.

SUMMARY

According to one aspect, a method for detecting a compromised client device includes the step of monitoring an execution of an application by a client device, where the client device may include a set of protected resources that are unavailable for use by the application. The method includes the steps of identifying an exposed resource, where the exposed resource may include a protected resource having a privilege level modified to enable the protected resource to be available for use by the application. The method may include the steps of maintaining a record of exposed resources, and detecting a hidden resource, where the hidden resource is available to the application but hidden from the record of exposed resources. The method includes selectively disabling the application in response to the detection of the hidden resource.

In some embodiments, the set of protected resources may include a system file, directory, library, variable, database, function, application, service, other restricted resource or some combination thereof. The step of monitoring the set of protected resources may include issuing a series of access requests to the set of protected resources, the series of access requests including an access request for each protected resource of the set of protected resources, the access request including a first access function.

In some embodiments, the step of monitoring the set of protected resources may include the step of periodically issuing the series of access requests to the set of protected resources using the first access function to provide a series of point-in-time lists of exposed resources, and where the record of exposed resources may include the series of point-in-time lists of exposed resources. The step of detecting the hidden resource may include the step of comparing the series of point-in-time lists of exposed resources to identify a potentially hidden resource including a previously exposed resource that is subsequently hidden from a point-in-time list of exposed resources.

In some embodiments, the step of detecting the hidden resource may include the step of determining whether the potentially hidden resource is hidden by issuing a second access request to the potentially hidden resource, the second access request including a second access function and, responsive to the potentially hidden resource being accessible using the second access function, determining that the potentially hidden resource is hidden. The method where the step of selectively disabling access includes disabling access by the application to the client device, to a server or to both when it is determined that the potentially hidden resource is hidden.

In some embodiments, the second access function may include a different level program code than the first access function. In some embodiments, the second access function may include a lower level program code function than the first access function. In some embodiments, the first access function may be a high level language file access function comprising one of a Java, FORTRAN, Objective-C, Swift, Pascal or other access function and the second access function may be a lower level access function comprising one of a machine code, assembly code or operating system code. Implementations of the described techniques may include hardware, a method or process, or computer software on a computer-accessible medium.

According to another aspect, a tamper discovery server includes a processor and a non-transitory storage device coupled to the processor including program code. The program code may be operable when executed upon by the processor during operation of the tamper discovery server to determine that a privilege level of a protected resource of a client device executing an application that communicates with a service provider has been modified. The program code may maintain, for the client device, a record of exposed resources, each exposed resource of the record corresponding to a protected resource having a modified privilege level and monitor the record of exposed resources to detect a hidden resource corresponding to a previously exposed resource that is subsequently hidden from the record of exposed resources. The program code may be further operable to determine whether the hidden resource is associated with malicious activity and to selectively disable the application when it is determined that the hidden resource is associated with malicious activity.

In some embodiments, the protected resource may include an application file of an operating system of the client device executing the application. The tamper discovery server may determine that the privilege level of the protected resource has been modified using a first access function program code.

In some embodiments, the program code that monitors the record of exposed resources to detect the hidden resource may include program code configured to periodically execute the first access function program code to generate a series of point-in-time access results and detect variations in the series of point-in-time access results. The program code may further detect a potentially hidden resource, the potentially hidden resource being previously included in the series of point-in-time access results and subsequently hidden from the record of exposed resources. The program code may be configured to determine whether the potentially hidden resource is hidden, using a second access function program code that includes a different level program code than the first access function program code. In some embodiments, the first access function may be a high level language file access function comprising one of Java, FORTRAN, Objective-C, Swift, Pascal or other access function and the second access function may be a lower level access function comprising one of a machine code, assembly code or operating system code.

According to a further aspect, a method for detecting, by a server, malicious activity at a client device executing an application includes the steps of determining that a privilege level of a protected resource of a set of protected resources of the client device has been modified in response to a successful access of the protected resource using a high level programming language access function. The method includes the steps of maintaining a list of protected resources having a modified privilege level as an exposed resource record and monitoring the exposed resource record over time to detect a potentially hidden resource, the potentially hidden resource including a modified privilege level protected resource that is hidden from the exposed resource record. The method includes the steps of determining that the potentially hidden resource is a hidden resource associated with malicious activity in response to successful access of the potentially hidden resource using a lower level programming language access function and selectively disabling access to the server by the application when the hidden resource is detected.

In various embodiments the protected resource may relate to an operating system of a client device, and the step of determining that the privilege level of the protected resource has been modified may indicate that the client device is a jailbroken device. Determining that the potentially hidden resource is hidden may indicate that the client device is a hooked client device.

In some embodiments, the step of monitoring the exposed resource record over time to detect the potentially hidden resource may include the steps of periodically accessing the set of protected resources using the high level programming language access function to identify accessible protected resources, storing a plurality of point-in-time lists of accessible protected resources and comparing the plurality of point-in-time lists of accessible protected resources to identify variations including to identify omission of previously accessible protected resources from later generated point-in-time lists, the variations including the potentially hidden resource.

Such an arrangement enables a service provider to quickly identify and isolate maliciously jailbroken devices for improved security.

DETAILED DESCRIPTION

A system and method for early detection of a compromised client device includes a tamper detection service configured to monitor changes to a jailbreak status of a client device over time to detect malware's efforts to hide the jailbreak status of the client device for malicious purposes.

In one embodiment, the tamper detection service stores a jailbreak record for at least one client device, the jailbreak record including a series of point-in-time lists of the jailbroken status of a set of protected resources of the client device, where the set of protected resources includes, but is not limited to, a system file, directory, library, variable, database, function, application, service, or other resource or having restricted access. The jailbreak record thus provides information as to which of the set of protected system resources have been exposed, or jailbroken, by unauthorized modification of the access privileges of the protected resource.

According to various aspects, the tamper detection service monitors changes in the jailbroken status of protected resources over time to expose attempts by malicious actors to hide jailbroken status. For example, the tamper detection service may monitor the series of lists of jailbroken status to detect changes to resource accessibility. In particular, the tamper detection service may monitor the series of lists to identify when a jailbroken file returns to a non-jailbroken state, an unusual activity indicative of a compromised client device.

The tamper detection service may therefore include methods for validating the jailbreak status of a client device, for example by launching multiple different access functions, each targeting the same protected resource, to determine whether the multiple access functions return the same, or different, results. Different results being returned by the multiple access functions indicates that at least one access function may have been hooked, and that the client device may be compromised. Thus, the tamper detection service provides an efficient way to quickly differentiate between voluntary and malicious jailbreaking, enabling fast, accurate, isolation of compromised client devices.

These and other features will now be described with reference to the figures, wherein like reference numerals are used to refer to like elements throughout. With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

Figure 1:
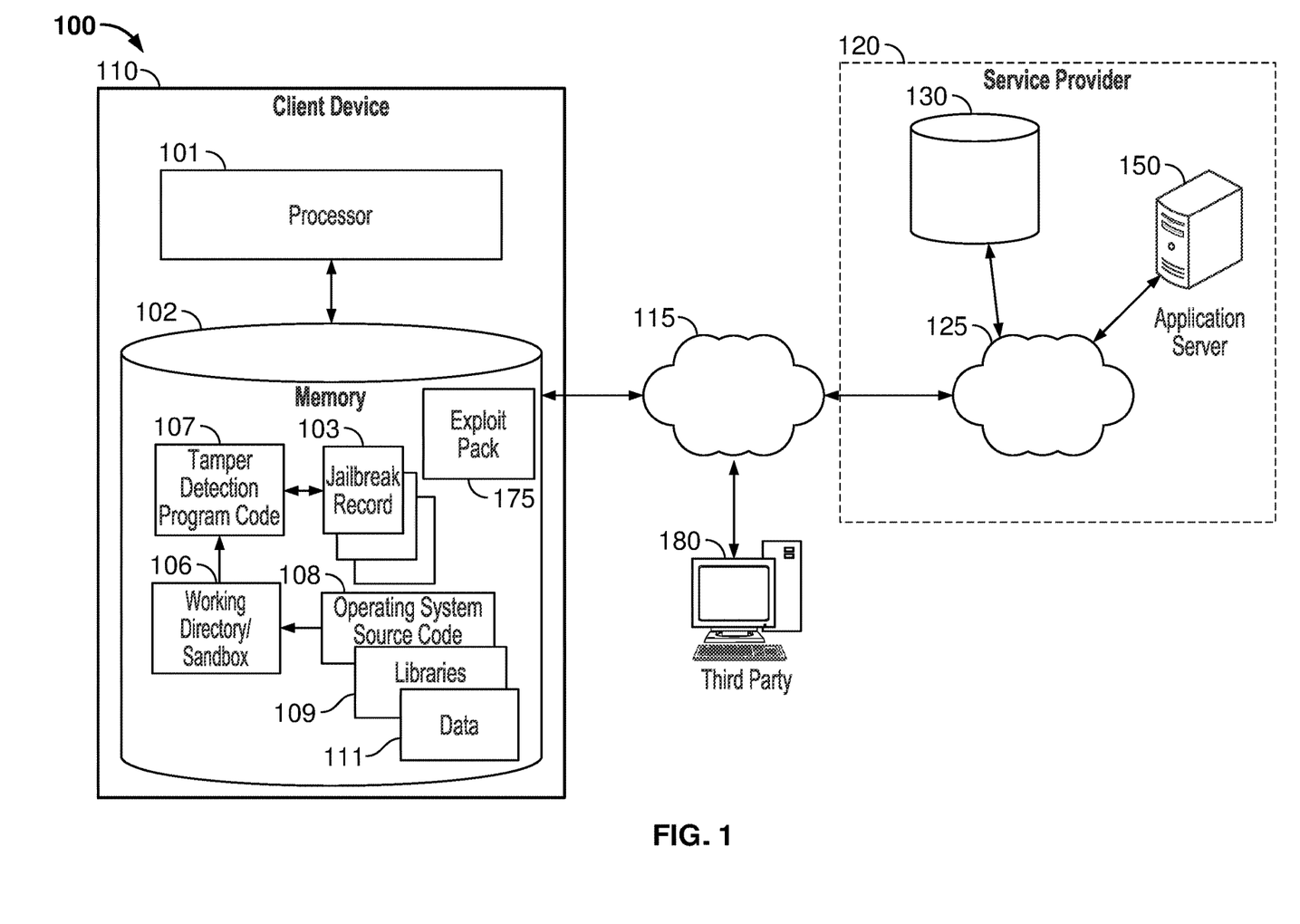
FIG. 1 is a block diagram of one embodiment of a service provider network comprising a client device configured with a tamper detection service as disclosed herein.

FIG. 1 illustrates one embodiment of a system 100 including a client device 110 and a third party device 180 coupled to a service provider 120 via a network 115. The client device 110 may comprise a network-enabled computer that communicates with the service provider 120 via networks 115 and 125 to access service provider content and services. The third party device 180 may download an exploit pack 175 onto the client device 110, where the exploit pack 175 comprises a toolkit configured to attack vulnerabilities of the system 100 for distribution of malware. As described in more detail below, the tamper detection service disclosed herein detects operation of the exploit pack, enabling quick isolation of the malware from the service provider 120 and improving overall system security.

As referred to herein, a network-enabled computer such as client device 110 may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client device 110 thus may include a processor 101 and a memory 102, and it is understood that the processing circuitry may contain additional components, including processors, memories, error and parity/CRC checkers, data encoders, anti-collision algorithms, controllers, command decoders, security primitives, and tamper-proofing hardware, to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, microphone, digital camera, video recorder or camcorder. These devices may be used to enter information and interact with the software and other devices described herein.

In some embodiments, the client device 110 also may be a mobile device, for example, such as an iPhone, iPod, iPad from Apple® and running Apple's iOS operating system. In general, the discussion in this specification focuses on a jailbreak detection based on an Apple iOS operating system. However, it is appreciated that the principles disclosed herein of monitoring changes to resource access privileges and validating resource accessibility using different access functions may be modified to achieve similar beneficial results using devices running different operating system software, such as any device running Microsoft's Windows® Mobile operating system, and/or any other smartphone or like wearable mobile device.

Client device 110 may operate using an operating system code 108, libraries 109, and other data 111. In some embodiments, the client may include a thin client application specifically adapted for communication with the service provider 120. The thin client application may be stored in a memory of the client device and be operable when executed upon by the client device to control an interface between the client device and a service provider application, permitting a user at the client device to access service provider content and services. The thin client application may comprise a variety of functions configured for communication with the service provider 120.

A working directory 106 (also referred to interchangeably herein as a 'Sandbox') may be associated with each application executed by the client device 110. In general, the working directory 106 defines the access privileges granted to the particular application and is, therefore, a protection mechanism that enables access only to those resources of the operating system/device (i.e., code 108, libraries 109 and other data files 111) that are required to run the application.

By limiting access to sensitive resources on a per-app basis, the working directory 106 provides a last line of defense against the theft, corruption, or deletion of user data, or the hijacking of system hardware, if an attacker successfully exploits security holes in an application executing on a client device. Access to any resource not explicitly requested in the project definition of an application and provided in the working directory is rejected by the system at run time.

Jailbreaking involves circumventing these protections to enable integration of third party functionality with existing, authorized applications. Some jailbreaking is voluntarily performed by the owner of the client device 110, for example to enable the owner to download publicly available functions, libraries, features, etc. to augment existing application functionality. Some jailbreaking is malicious jailbreaking, for example as described above when the third party 180 downloads the exploit pack 175 onto the client device 110. For example, the exploit pack may comprise malware configured to integrate with and infect applications executing on the client device 110 to gain access to information and/or functionality provided by the client device 110 and/or service provider 120. Often, the exploit pack 175 may attempt to impose itself upon the client application, for example gaining access the application and bypassing application program flow to modified, infected application functions.

In order to manipulate the client application in this manner, the exploit pack 175 circumvents client device protections that seek to limit interference with applications using jailbreak code (e.g., code with functionality similar to Cydia's Impactor), and downloads the exploit pack 175 to client device memory 102. The exploit pack may also include program code configured to implement countermeasures to service provider jailbreak detection mechanisms, including but not limited to implementing hooking code which bypasses system resource access requests, returning falsified access status to hide the jailbreak status of a protected file from jailbreak detection mechanisms.

Tamper detection functionality such as that disclosed in various embodiments herein may be used to secure system 100 by detecting malware jailbreak detection countermeasures to enable quick isolation of the infected client device 110.

In some embodiments, the tamper detection program code may monitor the working directory 106 for changes to access privileges. Monitoring the working directory 106 may include requesting access to a predetermined set of protected resources. The predetermined set of protected resources may include, but is not limited to, a system file, directory, library, variable, database, function, application, service, or other resource having restricted access or a combination thereof.

The tamper detection program code 107 may periodically save lists of access results for a predetermined set of protected resources as a point-in-time jailbreak record(s) 103 for the device, where the access results indicate whether an unauthorized access of a protected resource was successful. The tamper detection program code 107 may further monitor a series of jailbreak records 103, to identify patterns of changes to jailbreak status that are suggestive of a compromised client device. The tamper detection program code 107 may validate a jailbreak status, for example, by performing multiple different read operations to determine whether a protected resource may be accessed. These and other functions of the tamper detection program code are described in more detail with regard to FIGS. 3-7.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (WLAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

The service provider 120 is, in one embodiment, a business providing computer-based services to clients over a network 115. The combination of the software and hardware that provides a particular service of the service provider to a client is referred to herein as a 'server.' The servers may communicate over a private network 125 of the service provider, often referred to as a corporate or enterprise network. The private network 125 may comprise a wireless network, a wired network, or any combination of wireless network and a wired network as described above with regard to network 115.

Software services may be embodied in an application running on an electronic device, such as a desktop application running on an operating system of a computing device, a mobile application running on a mobile operating system of a mobile device, or a web application running on a browser component of either the mobile operating system or the desktop operating system. Those skilled in the art would understand how to design, build, and deploy the software application on any type of electronic device. In some embodiments, the application may be a browser application running on the operating system of a device.

In the system of FIG. 1, service provider 120 is shown to include an application server 150. Although only one application server 150 is shown, it is appreciated that service providers 120 may provide many application services to clients and may include many application servers. Although the application server 150 is illustrated as a discrete device, it is appreciated that the applications and servers may be distributed throughout the enterprise or, in the case of distributed resources such as 'cloud' resources, throughout the network 115 as physical or virtual servers. The application server 150 may support one or more application services provided by the service provider 120, for example, account management services.

Database 130 comprises data storage resources that may be used, for example, to store customer account, credential and other authentication information, as well as other data for use by application servers. The database 130 may be comprised of coupled data resources comprising any combination of local storage, distributed data center storage or cloud-based storage, wherein the data resources comprise non-transitory, tangible storage media, which do not include carrier waves or propagating data signals.

Figure 2:
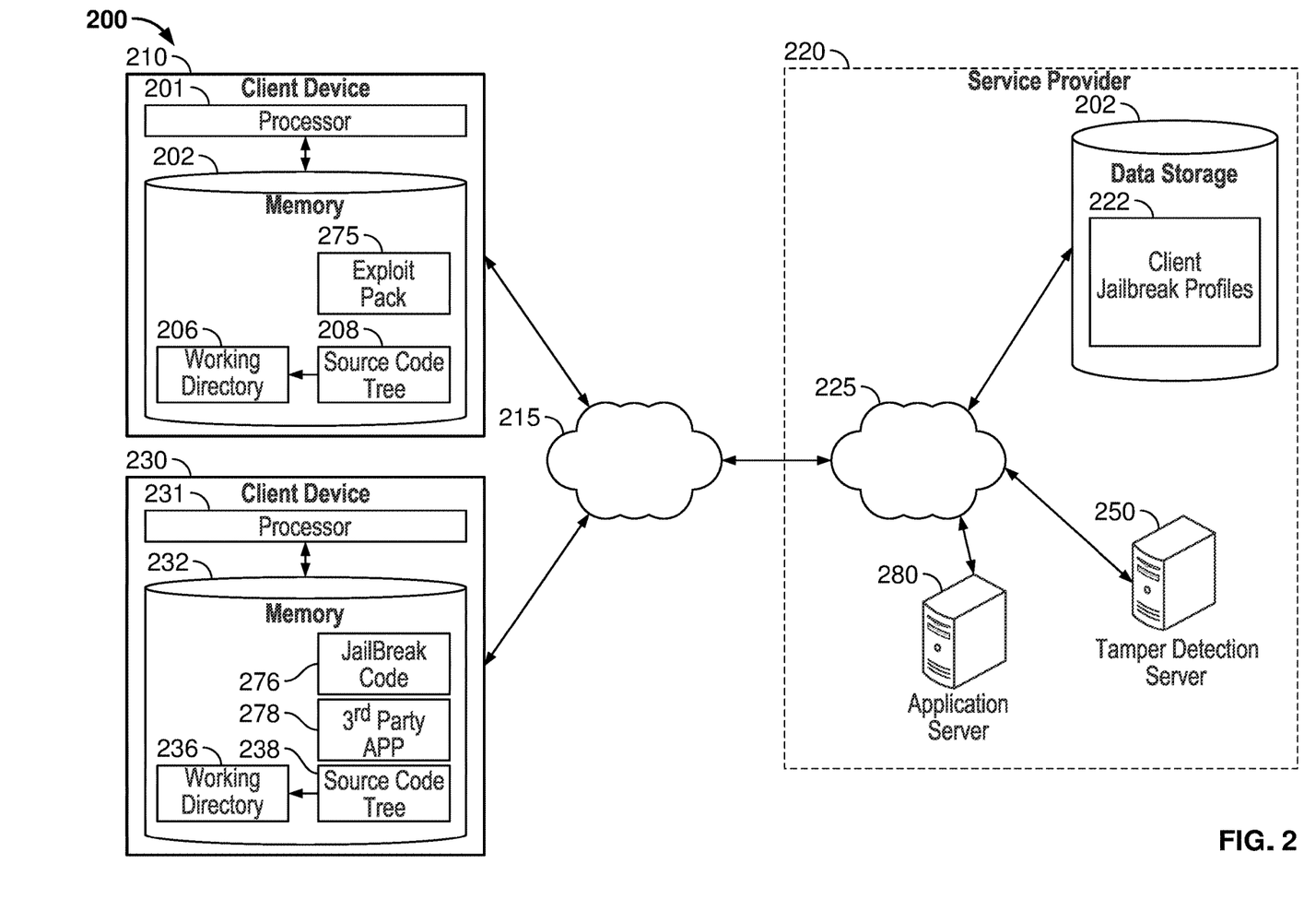
FIG. 2 is a block diagram of one embodiment of a service provider network comprising a server configured with a tamper detection service as disclosed herein.

FIG. 2 is a diagram of a computer system 200 comprising a plurality of client devices 210, 230 coupled via network 215 to a service provider 220. In contrast to FIG. 1, in the embodiment of FIG. 2, tamper detection is performed by the service provider 220, although it is appreciated that various elements of the tamper detection process may be implemented by the client device (s) 210, 230, by the service provider 220 or by both in cooperation.

In FIG. 2, client device 210 includes a processor 201 and a memory 202 configured to store a working directory 206 which provides access to a portion of the source code tree 208 for an application executing on the client device 210. Client device 210 is shown infected by exploit pack 275 in memory 202. For example, the exploit pack 275 may include a combination of jailbreak code and malware configured to interfere and impose upon client/server communications supporting an application executing on the client device 210.

Client device 230 includes a processor 231 and a memory 232 configured to store a working directory 236 which provides access to a portion of the source code tree 238 for an application executing on the client device 230. The working directories 206, 236 may differ depending upon the type, operation, and privilege levels of their supporting applications. The client device 230 is shown to include jailbreak code 276 and a third party application 278. It is appreciated that often a client may seek to install unauthorized third party applications on their client device. Because such practice is discouraged by device manufacturers, owners of the device may seek to voluntarily circumvent the protections by downloading jailbreak code 276. The Impactor code provided by Cydia is one program that may be used for jailbreak code delivery.

Accordingly, examining only the jailbreak status of resources of a client device provides an incomplete picture as to its state of compromise. Often, malware may attempt to hide the jailbreak status of the client device, for example by intercepting jailbreak detection mechanisms in a process referred to as 'hooking'. As described in greater detail below, the tamper detection service disclosed herein is able to distinguish between voluntary jailbreaks by owners of client devices such as client device 230 and malicious jailbreaks, such as at client device 210, through efficient identification of hooking behavior and isolation of hooked devices.

In one embodiment, the service provider 220 includes an enterprise network 225 coupling resources of the service provider 220 to the network 215. The resources include an application server 280 configured to support one or more application service for the client devices 210, 230, and a tamper detection server 250.

According to one embodiment, the tamper detection server 250 of the service provider 220 may populate and manage client jailbreak profiles 222 stored in data store 202 as described with regard to FIGS. 3-7. In one embodiment, the client jailbreak profile includes, for each coupled client device, one or more jailbreak record. Each jailbreak record may include a list of jailbroken status, each entry in the list associated with a jailbroken status of a protected resource of the client device at a given point-in-time. In one embodiment, a jailbreak status of TRUE indicates successful access of a protected resource, indicating that the resource has been exposed, e.g. jailbroken. A jailbreak status of FALSE indicates unsuccessful access of the protected resource.

Figure 3A:
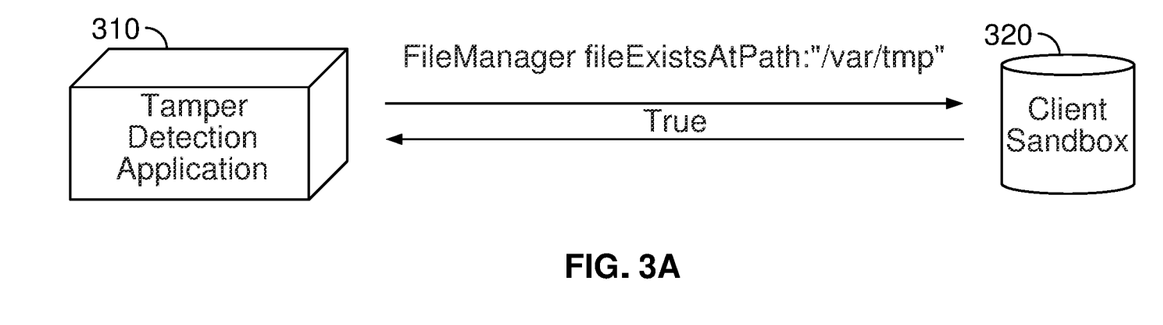
FIGS. 3A and 3B is a dataflow diagram illustrating one embodiment of a communication flow of a tamper detection service as disclosed herein.
Figure 3B:
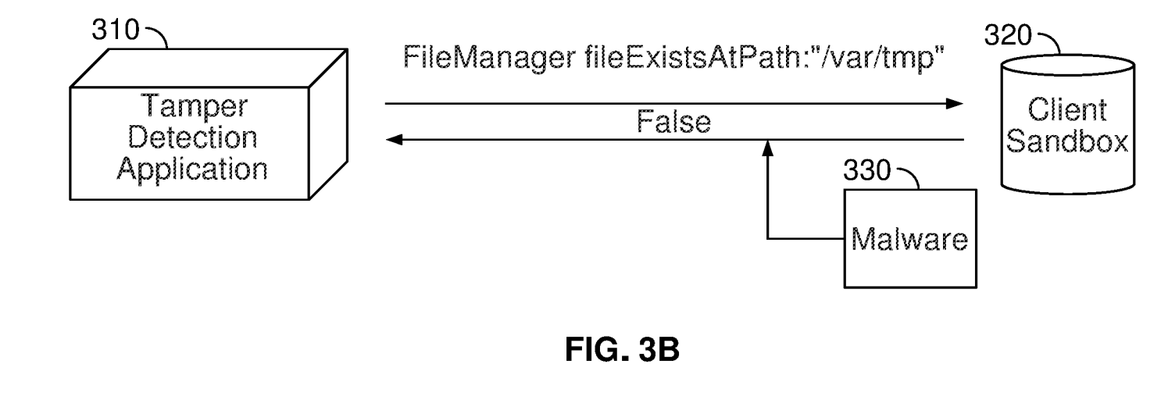

FIGS. 3A and 3B illustrate representative sequential accesses by a tamper detection application 310 to a sandbox 320 of a client device, for example, using access requests for example from a higher level language (HLL) such as Objective-C, Swift or the like. In FIGS. 3A and 3B, an Objective-C example access request of "FileManager fileExistsAtPath:" request for protected the root directory "/var/tmp" is shown. In an exemplary file check, a response to a request FileManager fileExistsAtPath: "/var/tmp" in FIG. 3A returns TRUE, indicating that the restricted directory is accessible, and that the client device has been jailbroken. Once service providers identify a jailbroken device, the application may restrict access to system resources while determining whether the client device is compromised.

As mentioned previously, hackers that are aware of such jailbreak detection mechanisms may hook, a FileManager fileExistsAtPath: "/var/tmp" request. In FIG. 3B, malware 330 is shown intercepting the root directory read and returning a FALSE response, effectively hiding the jailbroken status of "/var/tmp" from the server. According to one aspect, it is realized monitoring the behavior of jailbreak status of protected resources over time may be used to identify malware behavior on compromised client devices.

Figure 4:
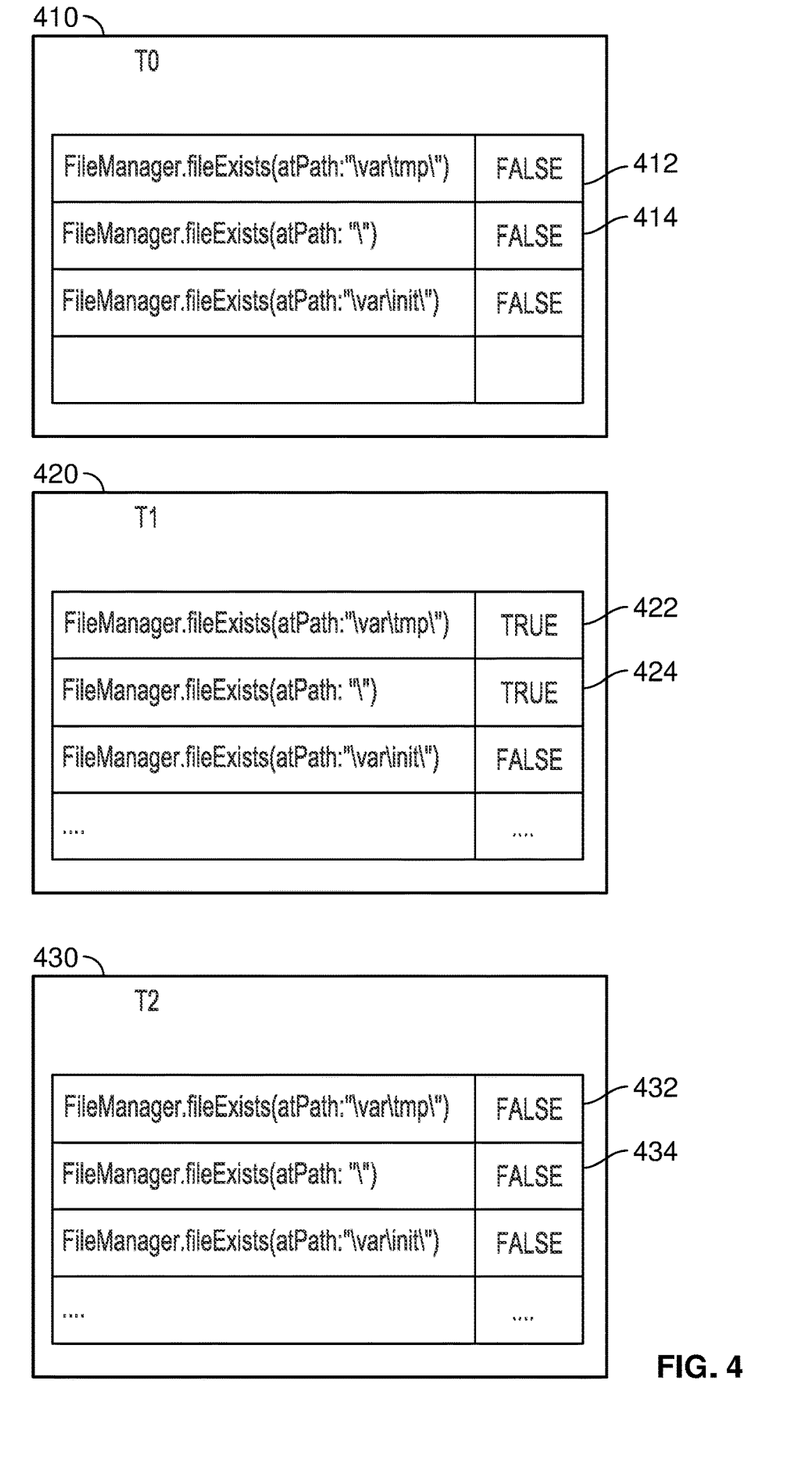
FIG. 4 illustrates points in time representations of an exemplary jailbreak record as disclosed herein.

FIG. 4 illustrates four sequential point-in-time jailbreak records 410, 420, and 430 for a client device. In one embodiment, a jailbreak record may be generated during a tamper detection process by recording accessibility results for a set of protected resources that are each accessed during a jailbreak check of the client device. In various aspects, jailbreak checks may be periodically performed, for example including but not limited to at each application access, or at various triggering events, such as each time a function or data source is accessed, or other criteria.

During each jailbreak check, the tamper detection service may access a set of protected resources using a high level language (HLL) access function to monitor and record changes to their accessibility. A high-level language (HLL) is a programming language such as Java, FORTRAN, Objective-C, Swift, Pascal or the like that enables a programmer to write programs that are more or less independent of a particular type of computer. Such languages are considered high-level because they are closer to human languages and further from machine languages. In contrast, assembly languages are considered low-level because they are very close to machine languages.

Changes to the accessibility of protected resources over time may indicate that the client device has been compromised. In one embodiment, changes to accessibility over time may be validated using a lower level language access function to ensure that malware or other malware is not hiding changes to the accessibility status of protected resources to obscure the compromised status of the client device.

For example, in FIG. 4 a high level language Swift access function of "FileManager.fileExists(atPath . . . )" may be shown used for initial jailbreak detection purposes. By way of example only, jailbreak record 410 stores access request results for a set of protected resources including the root directory "/var/tmp", the operating system root "/", and an initialization file "/init". At time T0, jailbreak access requests return FALSE results in record 410 entries 412 and 414, in response to attempts to access "/var/tmp", "/" and "/init". At time T1, jailbreak access requests return TRUE results in record 420 for entries 422 and 424. At time T2, the jailbreak access requests again return FALSE results for entries 432, 434 of record 430.

According to one aspect, the tamper detection process monitors such temporal variations in the jailbroken status of a set of protected resources to detect potentially hidden jailbroken resources, where potentially hidden jailbroken resources include those protected resources known to be previously exposed but no longer identified as exposed, jailbroken resources. Because malware may seek to hide the true jailbreak status of a resource, a tamper detection service as disclosed herein may launch multiple reads to identified potentially hidden jailbroken resources in order to determine whether the potentially hidden resource is truly no longer jailbroken, or whether malware is hiding the jailbroken status of the resource. In some embodiments, the multiple reads may use different types of access functions, for example varying in type, form, language, complexity, etc., to determine whether different access results are returned, indicating hooking of the service provider access request.

Figure 5:
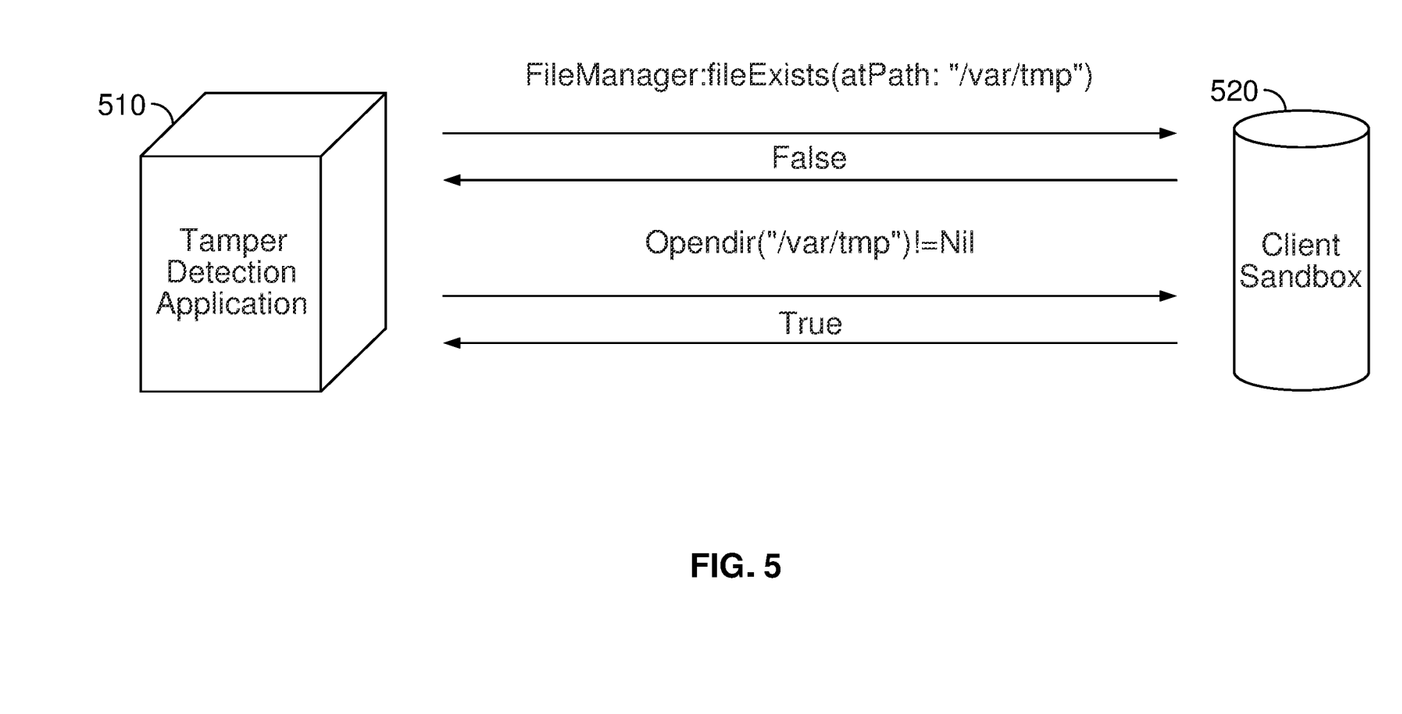
FIG. 5 is a dataflow diagram illustrating one embodiment of a communication flow of a tamper detection service as disclosed herein.

For example, referring now to FIG. 5, because hooking of a client device involves recognition and interception of jailbreak check mechanisms, in some embodiments secondary or additional attempts may be made to access the potentially hidden resource using a different access function that may be either unrecognized by the malware, or that uses a different software layer for communication. In some embodiments, the secondary access may occur simultaneously or sequentially with the initial jailbreak check. In some embodiments, the different access functions may be different access functions available in different levels of program code, such as higher-level functions and lower level functions. An example of a lower level function may include, for example, computing languages that relate more closely to the computers instruction set, such as machine code, assembly code, operating system code, DOS commands and other system level commands. In other embodiments, different access functions may be different high level language access functions. In some embodiments, the different access functions may comprise a combination of high level language and low level language access functions.

In the example of FIG. 5, client sandbox 520 returns "FALSE" in response to a FileManager:fileExists(atPath("/var/tmp") access request by a tamper detection application 510. As described with regard to FIG. 3B, such a FALSE response may falsely be provided following hooking of the FileManager:fileExists(atPath("/var/tmp") request by malware, when in fact "/var/tmp" has been jailbroken and is truly exposed but malware seeks to hide the jailbroken status from the service provider.

A lower level access request, such as an openDir("/var/tmp") request may subsequently (or simultaneously) be issued to validate the jailbroken status of the file. In FIG. 5, a returned value of TRUE indicates that "/var/tmp" is truly exposed and that the client device is executing malware that is hiding the jailbroken status of "/var/tmp". A mismatch between read results using different access functions may be used to quickly expose a compromised client.

Figure 6:
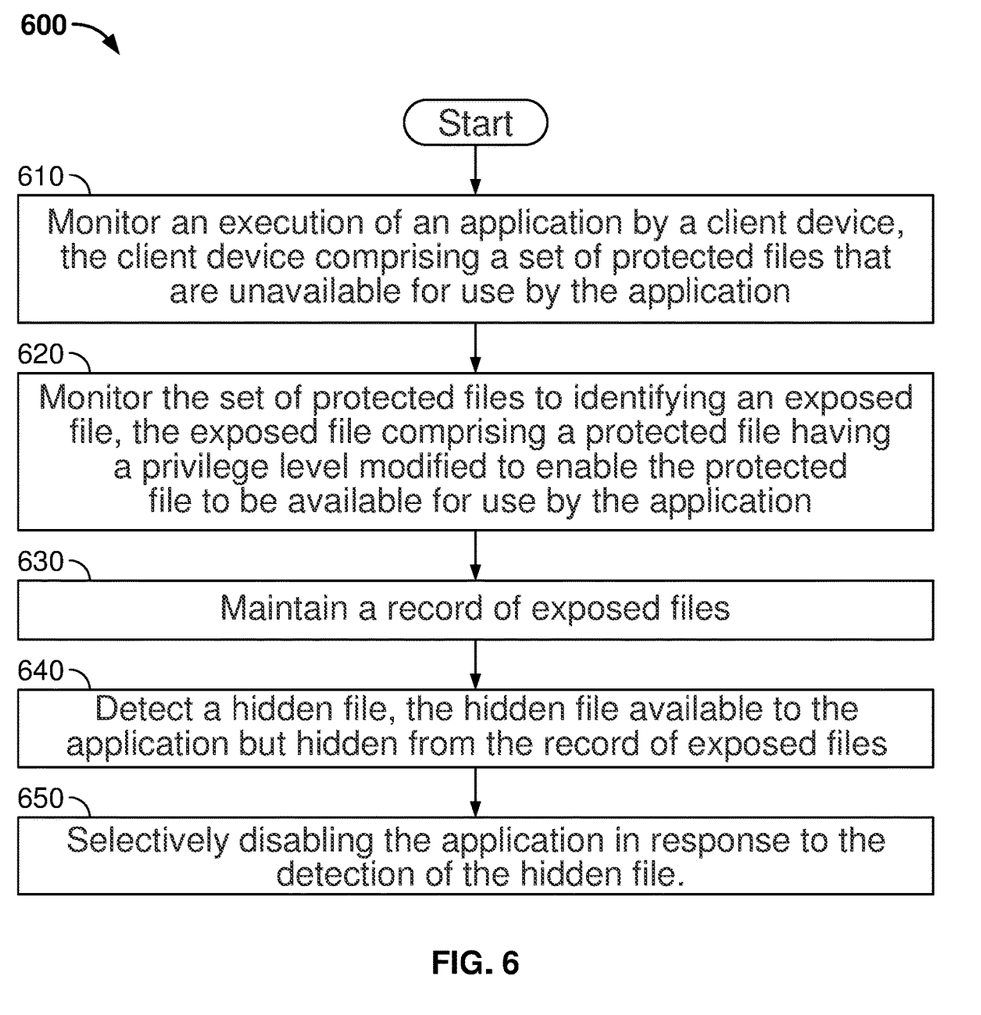
FIG. 6 is a flow diagram of one embodiment of a tamper detection process as disclosed herein.

FIG. 6 is a flow diagram illustrating exemplary steps of a tamper detection process 600 for detecting a compromised client device, where the client device executes an application comprising one or more protected resources. At step 610 the tamper detection service monitors an execution of an application by a client device, where the client device includes a set of protected resources that are typically unavailable for use by the application. At step 620, the process monitors the set of protected resources to identify an exposed resource, the exposed resource comprising a protected resource having a privilege level modified to enable the protected resource to be available for use by the application. At step 630, the tamper detection process maintains a record of exposed resources. In some embodiments, the process may maintain a list only of those files that have been jailbroken. In other embodiments, the process may save a status of an access request for each of the files in the set of protected resources (for example TRUE, or FALSE described in FIG. 4). Alternative methods of tracking identifiers of exposed resources are considered within the scope of this disclosure.

At step 640, the process detects a hidden resource, where the hidden resource may be available to the application but hidden from the record of exposed resources. At step 650, in response to the detection of the hidden resource, the tamper detection may selectively disable the application to isolate a compromised client device from the service provider system.

For example, malicious activity may be inferred when a pattern of accessibility is indicative of unauthorized manipulation of access privileges of the protected resource. The pattern may be, for example, a jailbroken file disappearing from the record of jailbroken resources. The method may include at step 650 selectively disabling access to the server by the application when it is determined that the file removal is associated with malicious activity.

Figure 7:
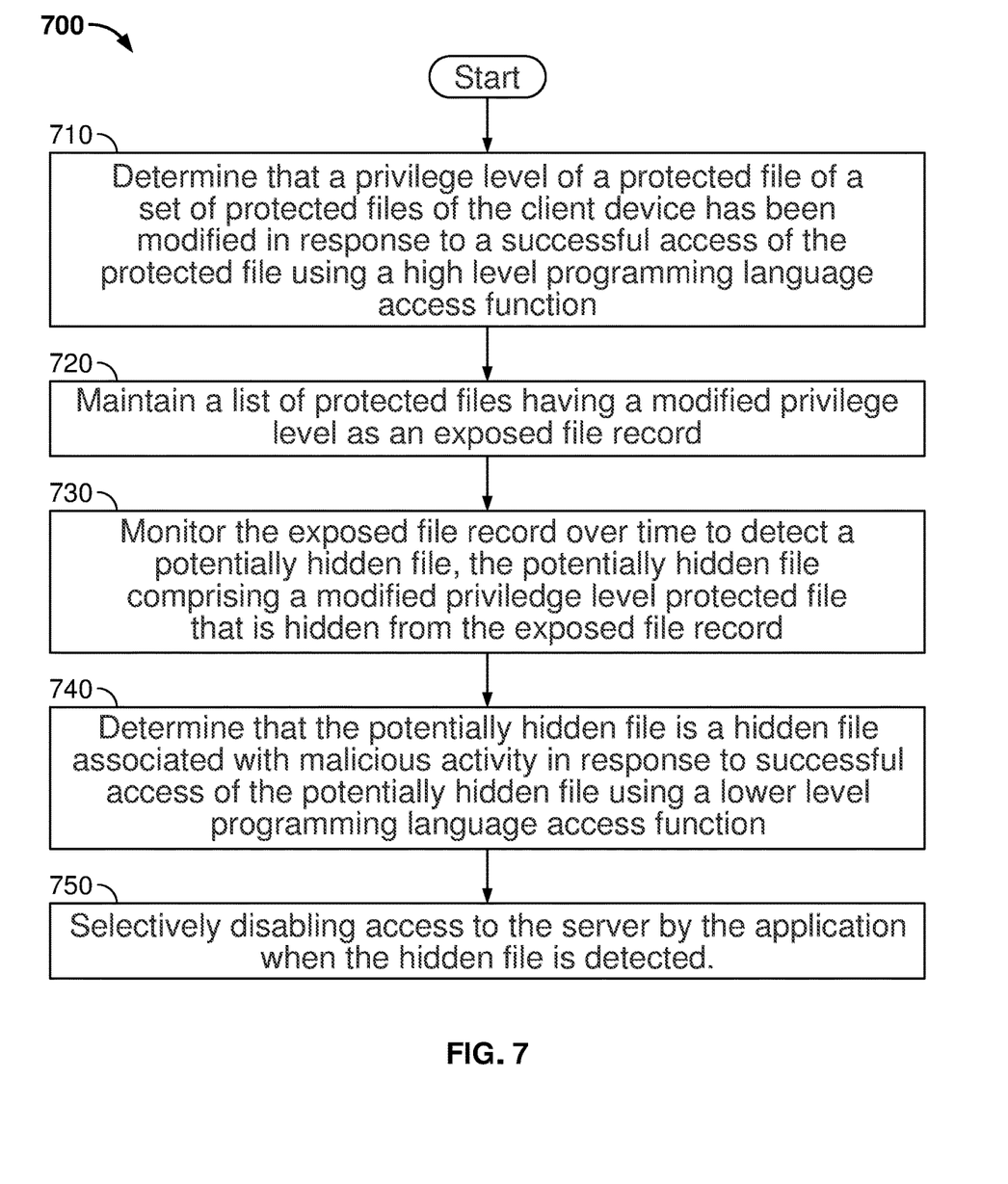
FIG. 7 is a flow diagram of another embodiment of a tamper detection process as disclosed herein.

FIG. 7 illustrates one embodiment of a tamper detection process 700 that may be used to detect malicious activity at a client device. At step 710 the process includes determining that a privilege level of a protected resource of a set of protected resources of the client device has been modified in response to a successful access of the protected resource using a high level programming language access function. At step 720, the process includes maintaining a list of protected resources having a modified privilege level as an exposed resource record. At step 730, the exposed resource record is monitored over time to detect a potentially hidden resource, the potentially hidden resource comprising a modified privilege level protected resource that is hidden from the exposed resource record. At step 740, the process determines whether the potentially hidden resource is a hidden resource associated with malicious activity in response to successful access of the potentially hidden resource using a lower level programming language access function. At step 750, the process selectively disables access to the server by the application when the hidden resource is detected.

As mentioned above, the tamper detection process may be implemented in whole or part by the client device. The client device may proactively provide a jailbreak status to the service provider or may store jailbreak records that may be read by a service provider application.

Accordingly, tamper detection processes include monitoring a jailbreak status of a client device to determine patterns indicative of a compromised device. Tamper detection processes may further include performing multiple read functions on protected resources of a client device to validate jailbreak status, for example, to overcome issues associated with hooked devices. The processes may be used individually or in combination and may be used in a tamper detection system provided by a client device, a service provider, or client device and service provider in combination. Such an arrangement improves the ability to quickly identify and remediate a compromised client and secure a computing environment.

Figure 8:
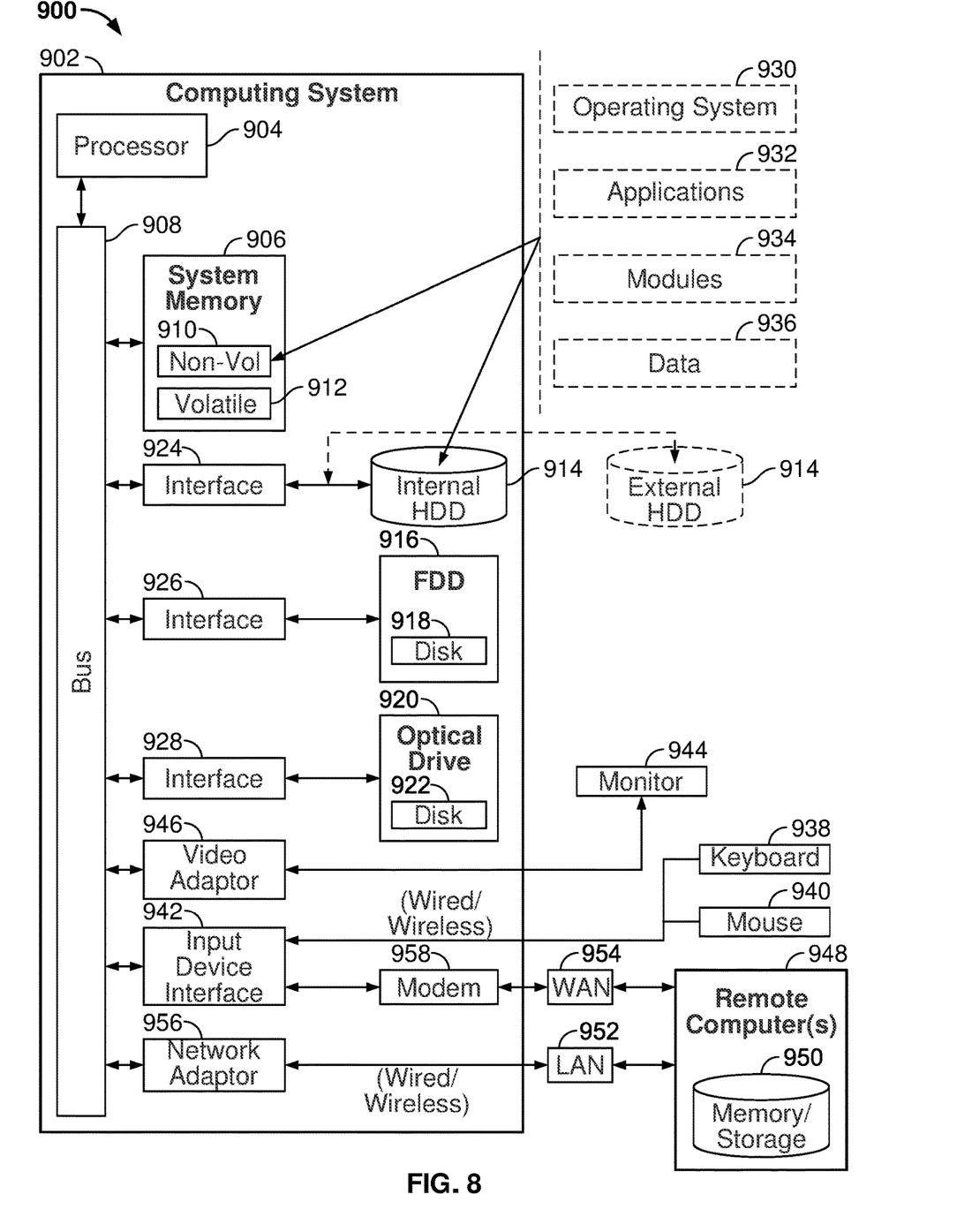
FIG. 8 is a block diagram illustrating exemplary components of a client device and/or application server that may be used to support the tamper detection functionality disclosed herein.

FIG. 8 illustrates an embodiment of an exemplary computing architecture 900 that may form the basis for the client device 110, 210, 230, and/or application server 150, 280, and tamper detection server 250. In various embodiments, the computing architecture 900 may comprise or be implemented as part of an electronic device that includes greater or fewer of the components shown in FIG. 7. The computing architecture 900 is configured to implement all logic, applications, systems, methods, apparatuses, and functionality described herein.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 8, the computing system 902 comprises a processor 904, a system memory 906 and a system bus 908. The processor 904 can be any of various commercially available computer processors. Dual microprocessors, multi-core processors, and other multi-processor architectures may also be employed as the processor 904.

The system bus 908 provides an interface for system components including, but not limited to, the system memory 906 to the processor 904. The components may be controlled by interfaces, for example disk devices may be controlled according to their various protocols by interfaces 924, 926, and 928. Network communications may be controlled by network adapter 956. The system memory 906 may include various types of computer-readable storage media in the form of one or more higher speed memory units including non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932 including the tamper detection program processes of FIGS. 5 and 6, other program modules 934, and program data 936.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908 but can be connected by other interfaces.

A monitor 944 or other type of display device is also connected to the system bus 908 via an interface, such as a video adaptor 946. The computing system 902 may operate in a networked environment using logical connections via wire and/or wireless communications to one or more remote computers, such as a remote computer 948 including a memory/storage device 950. The logical connections depicted include wire/wireless connectivity to a local area network (LAN) 952 and/or larger networks, for example, a wide area network (WAN) 954. The computing system 902 may also be operable to communicate with wired and wireless devices or entities using the IEEE 802 family of standards. One or more aspects of at least one embodiment may be implemented by representative instructions stored on a machine-readable medium which represents various logic within the processor, which when read by a machine causes the machine to fabricate logic to perform the techniques described herein.

As used in this application, the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives, a non-transitory computer-readable medium (of either optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    executing, by a processor of a mobile device, a first function on a set of protected resources, the first function comprising attempting to access each protected resource of the set of protected resource and generating first function access results;
    executing, by the processor of the mobile device, a second function on the set of protected resources, the second function comprising attempting to access each protected resource of the set of protected resource and generating second function access results, wherein the first function and the second function are implemented in different levels of programming language code, the second function is implemented in a lower level of programming language code, and the first function is implemented in a higher level of programming language code;
    determining, by the processor of the mobile device, a difference between the first function access results and the second function access results; and
    selectively disabling an application in response to determining the difference between the first function access results and the second function access results.

2. The computer-implemented method of claim 1, wherein selectively disabling access comprises disabling access by the application on the mobile device, to a server or to both.

3. The computer-implemented method of claim 1, wherein the higher level of programming language code comprises Java, FORTRAN, Objective-C, or Swift.

4. The computer-implemented method of claim 1, wherein the lower level of programming language code comprises machine code, assembly code, or operating system code.

5. The computer-implemented method of claim 1, wherein the set of protected resources comprises at least one of a system file, a directory, a library, a variable, a database, a function, an application, a service, other restricted resource, or a combination thereof.

6. The computer-implemented method of claim 1, wherein executing the first function comprises issuing a series of access requests to the set of protected resources, the series of access requests including an access request for each protected resource of the set of protected resources.

7. The computer-implemented method of claim 1, wherein executing the second function comprises issuing a series of lower-level access requests to the set of protected resources, the series of lower-level access requests including a lower-level access request for each protected resource of the set of protected resources.

8. A computing device, comprising:
    memory to store instructions;

processing circuitry coupled with the memory, the processing circuitry configured to execute the instructions to:

execute a first function on a set of protected resources, the first function to attempt to access each protected resource of the set of protected resource and generate first results;

execute a second function on the set of protected resources, the second function to attempt to access each protected resource of the set of protected resource and generate second results, wherein the second function is implemented in a lower level of programming language code, and the first function is implemented in a higher level of programming language code;

detect a difference between the first results and the second results; and perform an operation on an application in response to determining the difference.

9. The computing device of claim 8, wherein the operation comprises the processing circuitry to selectively disable access to the application on the mobile device, to a server or to both.

10. The computing device of claim 8, wherein the higher level of programming language code comprises Java, FORTRAN, Objective-C, or Swift.

11. The computing device of claim 8, wherein the lower level of programming language code comprises machine code, assembly code, or operating system code.

12. The computing device of claim 8, wherein the set of protected resources comprises at least one of a system file, a directory, a library, a variable, a database, a function, an application, a service, other restricted resource, or a combination thereof.

13. The computing device of claim 8, wherein the processing circuitry to execute the first function to issue a series of access requests to the set of protected resources, the series of access requests including an access request for each protected resource of the set of protected resources.

14. The computing device of claim 8, wherein the processing circuitry to execute the second function to issue a series of lower-level access requests to the set of protected resources, the series of lower-level access requests including a lower-level access request for each protected resource of the set of protected resources.

15. At least one non-transitory computer-readable medium comprising a set of instructions that, in response to being executed on a computing system, cause the computing system to:

execute a first function and a second function on a set of protected resources, the first function to generate first results based on attempting to access each protected resource of the set of protected resource, and the second function to generate second results based on the second function attempting to access each protected resource of the set of protected resource, wherein the second function is implemented in a lower level of programming language code, and the first function is implemented in a higher level of programming language code;

compare the first results and the second results;

perform an operation on an application in response to detecting difference between the first results and the second results.

16. The at least one non-transitory computer-readable medium of claim 15, wherein the operation comprises the computing system to selectively disable access to the application on the mobile device, to a server or to both.

17. The at least one non-transitory computer-readable medium of claim 15, wherein the higher level of programming language code comprises Java, FORTRAN, Objective-C, or Swift and the lower level of programming language code comprises machine code, assembly code, or operating system code.

18. The at least one non-transitory computer-readable medium of claim 15, wherein the computing system to:

execute the first function to issue a series of access requests to the set of protected resources, the series of access requests including an access request for each protected resource of the set of protected resources; and execute the second function to issue a series of lower-level access requests to the set of protected resources, the series of lower-level access requests including a lower-level access request for each protected resource of the set of protected resources.

* * * * *